UNITED STATES PATENT OFFICE.

HENRY G. BRACKIN, OF NEWPORT NEWS, VIRGINIA, ASSIGNOR TO ENGINEERING PRODUCTS CORPORATION, OF NEWPORT NEWS, VIRGINIA, A CORPORATION OF VIRGINIA.

SHIP'S-BOTTOM PAINT.

1,200,162.     Specification of Letters Patent.     Patented Oct. 3, 1916.

No Drawing.     Application filed August 7, 1915. Serial No. 44,200.

*To all whom it may concern:*

Be it known that I, HENRY G. BRACKIN, a citizen of the United States, residing in the city of Newport News, county of Warwick, State of Virginia, have invented a new and useful Ship's-Bottom Paint, of which the following is a specification.

My invention consists of a novel ship's bottom protection covering composition, and relates to paints specially applicable to ship bottoms, particularly below the water line, not only for the purposes of decoration, but more particularly to protect the surfaces from the entrance of moisture and decay, which is accomplished by closing the pores of the surface to which the paint is applied, thereby excluding the agents of destruction.

In carrying out my invention, I produce by the commingling of the ingredients hereinafter specified in one embodiment of my invention, an anti-corrosive paint, wherein the pigment contains an iron oxid, silica, zinc oxid and magnesia, which is ground in a mill to make the mixture homogeneous.

I combine the above pigment with a vehicle containing a mixture of denatured alcohol, shellac, tar oil and petroleum spirits, the proportions whereof may be varied somewhat according to requirements, my resultant novel composition of matter containing the following ingredients,—iron oxid, zinc oxid, silica, magnesia, pine tar oil, petroleum spirits, denatured alcohol and gum shellac.

If desired, I may employ a ship bottom paint having the same pigments and same amounts with a vehicle containing the following,—resin varnish, benzin and pine tar oil.

After applying the foregoing composition or paint to the ship's bottom, I apply thereon the following novel composition or anti-fouling paint, which paint is especially applicable to prevent marine growths of all kinds, and is composed of the following ingredients:—I employ a pigment containing iron oxid, silica, lime, zinc oxid, magnesia and mercuric oxid, the same being ground in a suitable mill. With this pigment, I combine a vehicle containing alcohol, shellac, tar oil and petroleum spirits, the proportions which I preferably employ being varied according to requirements, the resultant composition being as follows,—iron oxid, zinc oxid, silica, magnesia, lime, red oxid of mercury, pine tar oil, petroleum spirits, denatured alcohol, and gum shellac.

The term "petroleum spirits" is the tradename for a distillate manufactured from Texas petroleum, which distillate is free from solid paraffin and has a gravity of 42.2 Baumé, flash test 105 to 110 F., and an evaporation test of about 25 minutes.

If desired, I may employ an anti-fouling paint having the same amount of pigments with a vehicle containing resin varnish, benzin and tar oil.

It will now be apparent that I have devised a novel and useful ship bottom paint, which embodies the features of advantage enumerated as desirable in the statement of the invention and the above description, and while I have, in the present instance, shown and described a preferred embodiment thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A paint comprising a pigment of iron oxid, silica, zinc oxid and magnesia commingled with a vehicle containing a mixture of denatured alcohol, shellac, tar oil and petroleum spirits.

2. The herein described paint comprising iron oxid, silica, lime, zinc oxid, magnesia and mercuric oxid, with a vehicle containing alcohol, shellac, tar oil and petroleum spirits.

HARRY G. BRACKIN.

Witnesses:
GEO. A. PARKER,
WM. BUCKINGHAM.